US009213459B2

(12) United States Patent
Yoshino et al.

(10) Patent No.: US 9,213,459 B2
(45) Date of Patent: Dec. 15, 2015

(54) ELECTRONIC APPARATUS PROVIDED WITH RESISTIVE FILM TYPE TOUCH PANEL

(71) Applicant: YOKOGAWA ELECTRIC CORPORATION, Musashino-shi, Tokyo (JP)

(72) Inventors: Yasuhiro Yoshino, Musashino (JP); Yuji Hosaka, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 35 days.

(21) Appl. No.: 14/052,071

(22) Filed: Oct. 11, 2013

(65) Prior Publication Data

US 2014/0104230 A1 Apr. 17, 2014

(30) Foreign Application Priority Data

Oct. 15, 2012 (JP) .................................. 2012-228037

(51) Int. Cl.
*G09G 5/00* (2006.01)
*G06F 3/045* (2006.01)
*G06F 3/041* (2006.01)

(52) U.S. Cl.
CPC .............. *G06F 3/045* (2013.01); *G06F 3/0416* (2013.01); *G06F 2203/04104* (2013.01)

(58) Field of Classification Search
CPC ... G06F 3/03567; G06F 3/0412; G06F 3/045; G06F 3/017; G06F 3/04883; G06F 3/0416; G06F 2203/04104
USPC ...................... 345/173–178; 178/18.01–18.09
See application file for complete search history.

(56) References Cited

U.S. PATENT DOCUMENTS

| 8,863,042 | B2* | 10/2014 | Kulas ............................. 715/864 |
| 2009/0189877 | A1* | 7/2009 | Washino et al. ............... 345/174 |
| 2010/0026713 | A1* | 2/2010 | Goto et al. ..................... 345/629 |
| 2011/0254785 | A1* | 10/2011 | Li .................................. 345/173 |
| 2012/0056831 | A1* | 3/2012 | Noda ............................. 345/173 |

FOREIGN PATENT DOCUMENTS

| JP | 2009-257927 A | 11/2009 |
| JP | 2010-176410 A | 8/2010 |
| JP | 2011-33440 A | 2/2011 |
| JP | 2012-014299 A | 1/2012 |

* cited by examiner

Primary Examiner — Jennifer Nguyen
(74) Attorney, Agent, or Firm — Sughrue Mion, PLLC (57) ABSTRACT

A two-point touch determining module performs determination of a one-point touch or a two-point touch. A one-point touch coordinate detecting module detects a coordinate of the one-point touch. A two-point touch coordinate detecting module detects two-point coordinates of the two-point touch. A display screen generating module generates a display screen of a resistive film type touch panel. A touch input controlling module determines whether the display screen is a one-point detecting screen or a two-point detecting screen. The touch input controlling module performs the coordinate detection using the one-point touch coordinate detecting module in a case of the one-point detecting screen. The touch input controlling module performs the coordinate detection using the one-point touch coordinate detecting module or the two-point touch coordinate detecting module according to a determination result of the two-point touch determining module in a case of the two-point detecting screen.

6 Claims, 6 Drawing Sheets

ELECTRONIC APPARATUS PROVIDED WITH RESISTIVE FILM TYPE TOUCH PANEL

CROSS-REFERENCE TO RELATED APPLICATION(S)

The present application claims the benefit of priority of Japanese Patent Application No. 2012-228037, filed on Oct. 15, 2012. The disclosures of the application are incorporated herein by reference.

BACKGROUND

1. Technical Field

The present disclosure relates to an electronic apparatus provided with a resistive film type touch panel, particularly, to an electronic apparatus provided with a resistive film type touch panel having a two-point touch detecting function.

2. Related Art

A touch panel has been widely used as an input device which receives an operation from a user. The touch panel is a device that is obtained by combining a display device for performing a screen display and a touch sensor for detecting a touch position, and the touch panel is capable of simply performing an intuitive operation. A resistive film type or an electrostatic capacity type is typical as an operating principle of the touch panel.

Among them, the resistive film type has a basic configuration in which two sheets of resistive films are arranged to face each other at a minute distance, a voltage is applied with respect to one resistive film and the voltage is detected with respect to the other resistive film. Since two sheets of the resistive films come into contact with each other by a touch and a voltage value of a partial pressure ratio is detected corresponding to a contact point with respect to the resistive film of the detecting side, it is possible to specify the touch position.

Since it is possible to detect a touch operation content such as a moving direction by obtaining the touch position in a predetermined detecting period, the operation can be performed corresponding to the touch operation such as a swipe or a tap. The configuration of the resistive film type is simple and the resistive film type touch panel can be manufactured at low cost, and thus, the resistive film type has become the mainstream as a method of the touch panel.

RELATED ART DOCUMENT

Patent Document

[Patent Document 1] JP-A-2011-33440

In the related art, the resistive film type touch panel is considered that a two-point touch cannot be detected from the operating principle thereof. That is, when two sheets of the resistive films come into contact with each other at two points, an electric current flows between the contact points even in the resistive film of the detecting side, and therefore, an intermediate point of the two points is detected as a touch position.

In recent years, a technique which calculates coordinates of the two points by a software processing from the detected intermediate point or the like has been developed and the practical use thereof is in progress. In the resistive film type touch panel which corresponds to the two-point touch, when a touch state is detected, first, it is determined whether the touch is a one-point touch or a two-point touch. When the touch is determined as the one-point touch, the detecting process is performed as in the related art, and when the touch is determined as the two-point touch, the coordinates of the two points are detected by the calculating process.

However, in the technology at this time, the accuracy of determining whether the touch is the one-point touch and the two-point touch is not necessarily sufficient. Therefore, when the resistive film type touch panel which corresponds to the two-point touch is intactly adopted as an electronic apparatus, the touch is determined as a two-point touch although it is supposed to be determined as a one-point touch or the touch is determined as a one-point touch although it is supposed to be determined as a two-point touch, and thus, there is a possibility that the operation according to the intention of the user is not performed.

Furthermore, since the determination of whether the touch is a one-point touch or a two-point touch is performed first, there is a possibility that a detecting operation is delayed and a response becomes dull in the case of performing a one-point input operation of the related art. In addition, there is a possibility that follow-up performance with respect to the pen movement deteriorates in the case of a handwriting character input in which characters using a touch pen or the like are input on the touch panel.

SUMMARY

Exemplary embodiments of the invention provide an electronic apparatus provided with a resistive film type touch panel which can prevent operability from decreasing when an electronic apparatus adopts a resistive film type touch panel having a two-point touch detecting function.

An electronic apparatus provided with a resistive film type touch panel, according to an exemplary embodiment of the invention, comprises:

a two-point touch determining module configured to perform determination of a one-point touch or a two-point touch;

a one-point touch coordinate detecting module configured to detect a coordinate of the one-point touch;

a two-point touch coordinate detecting module configured to detect two-point coordinates of the two-point touch;

a display screen generating module configured to generate a display screen of the resistive film type touch panel; and a touch input controlling module configured to determine whether the display screen is a one-point detecting screen or a two-point detecting screen, wherein the touch input controlling module performs the coordinate detection using the one-point touch coordinate detecting module when touch to the resistive film type touch panel is detected in the one-point detecting screen, and, the touch input controlling module performs the coordinate detection using the one-point touch coordinate detecting module or the two-point touch coordinate detecting module according to a determination result of the two-point touch determining module when touch to the resistive film type touch panel is detected in the two-point detecting screen.

The touch input controlling module may be configured to make a touch detecting period of the one-point detecting screen be shorter than that of the two-point detecting screen.

The display screen generating module may be configured to make a screen updating period of the one-point detecting screen be shorter than that of the two-point detecting screen.

The display screen generating module may be configured to include information, which indicates whether it is the one-point detecting screen or the two-point detecting screen, on the display screen.

The electronic apparatus may function as a waveform display device, and the two-point detecting screen may include a waveform display screen.

Exemplary embodiments of the invention provide an electronic apparatus provided with a resistive film type touch panel which can prevent operability from decreasing when an electronic apparatus adopts a resistive film type touch panel having a two-point touch detecting function.

DETAILED DESCRIPTION

Embodiments of the present invention will be described with reference to the drawings. The embodiments will describe a case where the electronic apparatus provided with a resistive film type touch panel is applied to a waveform display device according to the present invention. The present invention is not limited to the waveform display device, and can be widely applied to other electronic apparatus such as a programmable display device, a paperless recorder, or a waveform measuring device.

Figure 1:
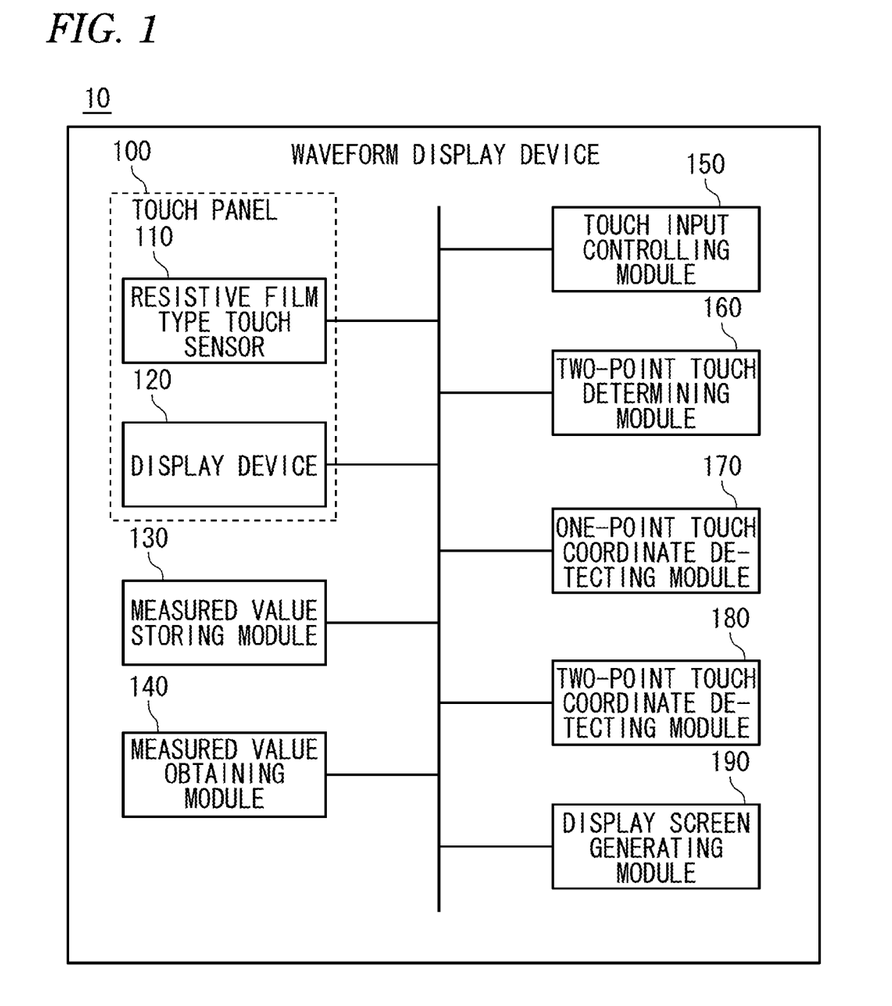
FIG. 1 is a block diagram illustrating a configuration of a waveform display device according to an embodiment.

FIG. 1 is a block diagram illustrating a configuration of the waveform display device according to the embodiment. As shown in FIG. 1, the waveform display device 10 includes a resistive film type touch panel 100, a measured value storing module 130, a measured value obtaining module 140, a touch input controlling module 150, a two-point touch determining module 160, a one-point touch coordinate detecting module 170, a two-point touch coordinate detecting module 180 and a display screen generating module 190.

The resistive film type touch panel 100 includes a resistive film type touch sensor 110 and a display device 120. A waveform display screen, a setting reception screen or the like is displayed to the display device 120, and an operation is received from a user by sensing a touch to the screen with the resistive film type touch sensor 110.

The measured value storing module 130 stores the measured value that is obtained by the measured value obtaining module 140. The measured value is stored by a time series in a predetermined file format. The measured value obtaining module 140 obtains continuously the measured value which is a measurement result from a measuring device of the outside. The measured value obtaining module 140 may include a measuring function.

The touch input controlling module 150 controls the operations of the two-point touch determining module 160, the one-point touch coordinate detecting module 170 and the two-point touch coordinate detecting module 180, and detects contents of the touch input with respect to the touch panel 100.

The two-point touch determining module 160 determines whether the touch input is the one-point touch or the two-point touch with respect to the touch panel 100. In order to determine whether the touch is the one-point touch or the two-point touch, it is possible to use various methods which are currently proposed or which will be proposed in the future.

The one-point touch coordinate detecting module 170 calculates the coordinate of the touched one point, on the basis of a partial pressure ratio that is detected by the resistive film type touch sensor 110. The one-point touch coordinate detecting module 170 is capable of using the technique used in the resistive film type touch panel which detects a point in the related art.

When the two-point touch is determined, the two-point touch coordinate detecting module 180 calculates the coordinates of the touched two points on the basis of the partial pressure ratio that is detected by the resistive film type touch sensor 110, or the like. In order to calculate the coordinates of the touched two points, it is possible to use various methods which are currently proposed or which will be proposed in the future.

The display screen generating module 190 generates the display screen which is displayed on the display device 120. In the embodiments, the display screen generating module 190 generates two kinds of the display screens in which a one-point detecting screen performs the coordinate detection of only one point, and a two-point detecting screen determines whether the touch is the one-point touch or the two-point touch and performs the coordinate detection of the one point or the coordinate detection of the two points corresponding to a determination result.

It is possible to determine which of the screens is the one-point detecting screen and which of the screens is the two-point detecting screen in advance. For example, if the screen receives the operation by the operation of the two points and the operation is easy to understand intuitively, the screen becomes the two-point detecting screen. It is also possible to perform the one-point operation on the two-point detecting screen.

If the electronic apparatus is the waveform display device, a movement instruction of the waveform is performed with the one-point operation such as a swipe, and an expansion operation and a reduction operation of the waveform are performed with the two-point operation such as a spread and a closing, thereby improving the operational feeling. Therefore, it is preferable that the waveform display screen is the two-point detecting screen. Similarly, it is preferable that the screen which performs setting of a display range is also the two-point detecting screen.

On the other hand, since the operation feeling is not appropriately improved even if the screen is performed with the two-point operation, it is preferable that for example, a menu screen or a setting screen is the one-point detecting screen from the viewpoint of preventing erroneous detection. Moreover, if the screen is provided with a handwriting input function using a touch pen or the like, it is determined whether the touch is the one-point touch or the two-point touch, the follow-up performance with respect to the pen movement deteriorates, and thus it is preferable that the handwriting input screen is the one-point detecting screen.

However, even the same screen may be dynamically switched between the one-point detecting screen and the two-point detecting screen, depending on a situation or an actual result, and the user may switch the screens by setting the one-point detecting screen and the two-point detecting screen.

Next, the operation of the waveform display device 10 having the configuration described above will be described with reference to a flowchart of FIG. 2.

The display screen generating module 190 generates the display screen (S101), and the touch input controlling module 150 determines whether the display screen is the two-point detecting screen or the one-point detecting screen (S102).

In the case of the two-point detecting screen (S102: Yes), a touch detecting period is set to be long (S103). At this time, in the two-point detecting screen, it is determined whether the touch is the one-point touch or the two-point touch, and the one-point coordinate detection or the two-point coordinate detection is performed corresponding to the determination result. Accordingly, a processing load becomes large, and a longer detecting time is required than the one-point detecting process of the related art.

When the touch is detected in the two-point detecting screen (S104: Yes), the touch input controlling module 150 determines whether the touch is the one-point touch or the two-point touch using the two-point touch determining module 160 (S105).

As a result, if the touch is the one-point touch (S105: No), the one-point coordinate detection is performed using the one-point touch coordinate detecting module 170 in the same manner of the related art (S106). On the other hand, if the touch is the two-point touch (S105: Yes), the coordinates of the two points are respectively detected using the two-point touch coordinate detecting module 180 (S107).

Furthermore, the operation is performed corresponding to the detection as necessary (S108). FIG. 3 shows an example of the operation when a swipe W1 by the one-point touch is detected on a waveform display screen 500 which is the two-point detecting screen. As shown in FIG. 3, when the one-point swipe W1 is received in the waveform display screen 500, the waveform is moved in the swipe direction.

Figure 4:
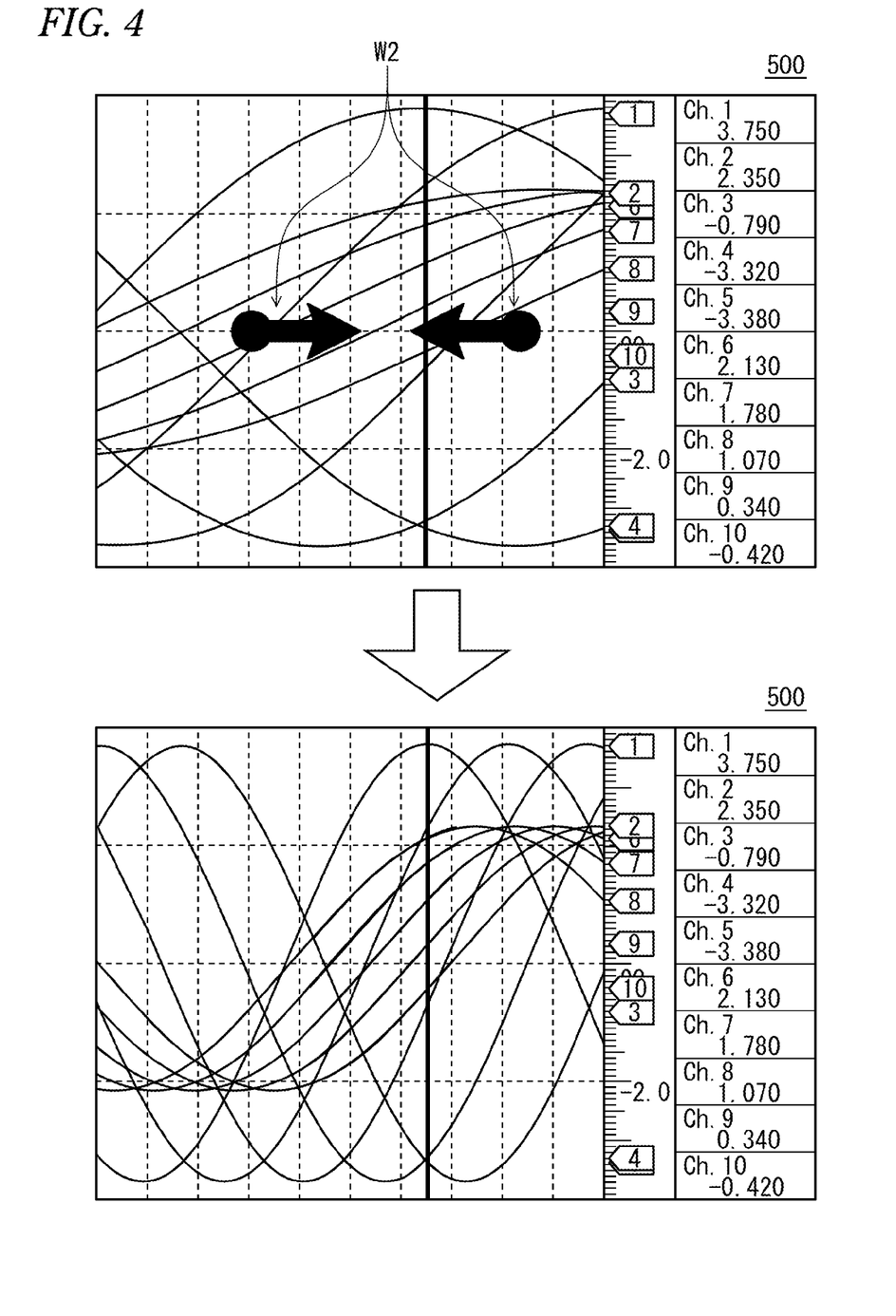
FIG. 4 is a diagram illustrating an example of an operation when a swipe by a two-point touch is detected on the waveform display screen which is the two-point detecting screen.

Moreover, FIG. 4 shows an example of the operation when the operation W2 by the two-point touch is detected on the waveform display screen 500 which is the two-point detecting screen. As shown in FIG. 4, when the two-point operation W2 such as narrowing fingers is received in the waveform display screen 500, the waveform is reductively displayed in the time axis direction. In contrast, if the two-point operation such as spreading fingers (not shown) is received in the waveform display screen 500, and the waveform is expansively displayed in the time axis direction.

In this manner, since the operation by the one-point touch or the operation by the two-point touch is received and the operation is performed corresponding to the received operation on the waveform display screen 500 which is the two-point detecting screen, the waveform display device 10 is capable of performing the operation easy to understand intuitively.

Figure 2:
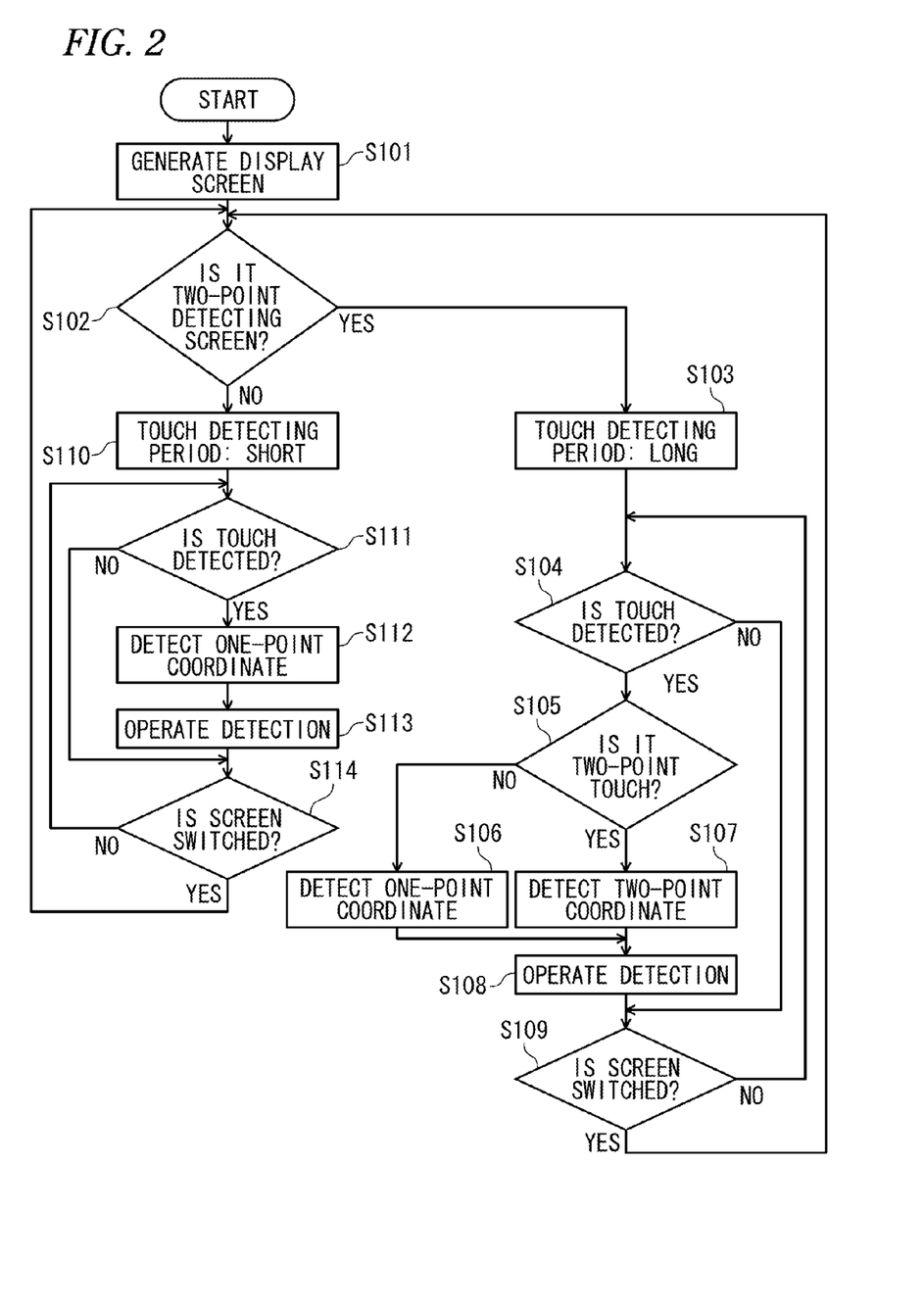
FIG. 2 is a flowchart illustrating an operation of the waveform display device.
Figure 3:
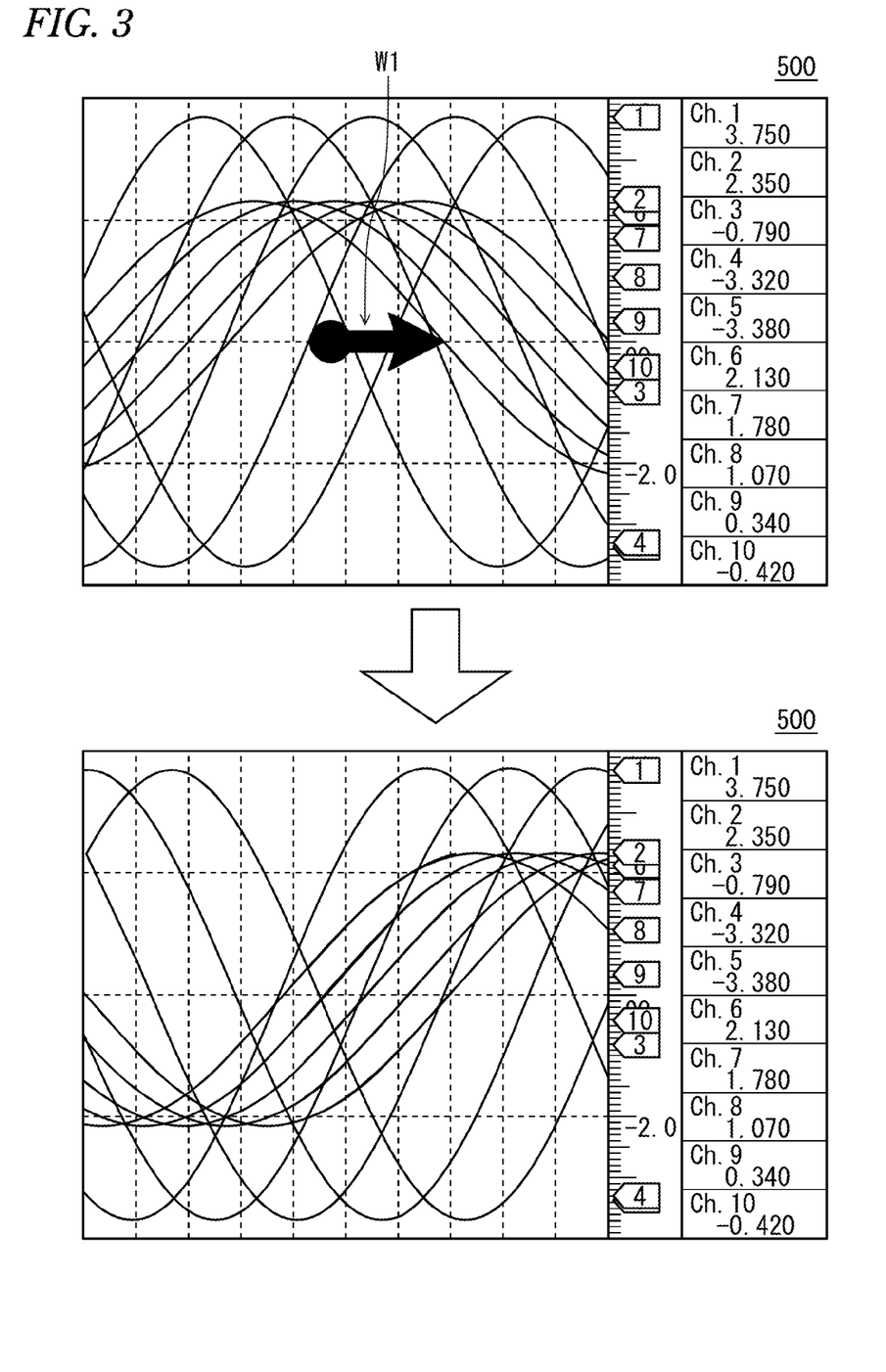
FIG. 3 is a diagram illustrating an example of an operation when a swipe by a one-point touch is detected on a waveform display screen which is a two-point detecting screen.

Returning to the description of the flowchart of FIG. 2, the operation in the two-point detecting screen is repeated till the display screen generating module 190 switches the display screen (S109: No), or if the display screen is switched (S109: Yes), it is performed to determine whether the display screen is the one-point detecting screen or the two-point detecting screen again (S102).

As the result of performing to determine whether the screen is the one-point detecting screen or the two-point detecting screen (S102), the touch detecting period is set to be short (S110) in the case of the one-point detecting screen (S102: No). At this time, the case is the detecting process of only one point, and thus the processing load is small and the detecting process is performed at high speed. In addition, by shortening the touch detecting period, the follow-up performance with respect to the pen movement is improved in the case of the handwriting input.

When the touch is detected in the one-point detecting screen (S111: Yes), the touch input controlling module 150 does not perform to determine whether the touch is the one-point touch or the two-point touch, but the touch input controlling module 150 performs the one-point coordinate detection using the one-point touch coordinate detecting module 170 (S112).

Figure 5:
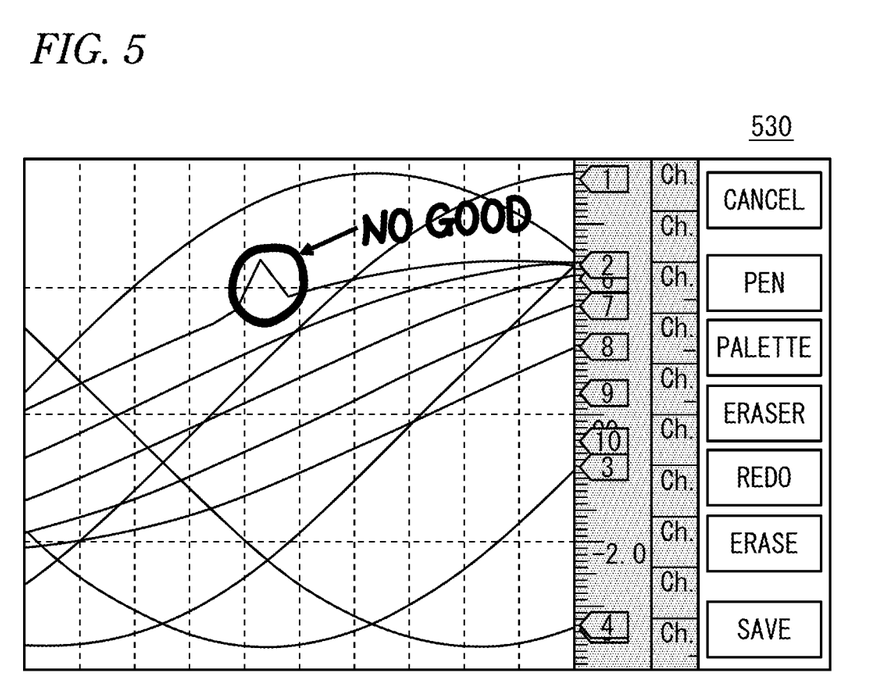
FIG. 5 is a diagram illustrating an example of an operation when a handwriting input is detected on a handwriting input screen which is a one-point detecting screen.

Therefore, the operation is performed corresponding to the detection as necessary (S113). FIG. 5 shows an example of the operation when the handwriting input is detected on a handwriting input screen 520 which is the one-point detecting screen. As shown in FIG. 5, the handwriting input is received, and the character which follows with respect to the movement of the pen or the like, can be displayed in the handwriting input screen 520.

In this manner, since the one-point coordinate detection is performed at a short period on the handwriting input screen 520 which is the one-point detecting screen, without performing the determination of whether the touch is the one-point touch or the two-point touch, the follow-up performance with respect to the pen movement does not deteriorate. Moreover, even in the menu screen or the setting screen, a rapid response can be performed while preventing erroneous detection by being the one-point detecting screen.

Returning to the description of the flowchart of FIG. 2, the operation in the one-point detecting screen is repeated till the display screen generating module 190 switches the display screen (S114: No), or if the display screen is switched (S114: Yes), it is performed to determine whether the display screen is the one-point detecting screen or the two-point detecting screen again (S102).

Additionally, in the examples described above, the touch detecting period of the one-point detecting screen is made to be shorter than the touch detecting period of the two-point detecting screen, but further, a screen updating period of the display device 120 by the display screen generating module 190 of the one-point detecting screen may be made to be shorter than that of the two-point detecting screen.

Consequently, in the handwriting input screen, the response of the screen with respect to the pen movement is faster and it is possible to achieve a smooth writing input. Moreover, by lengthening the screen updating period of the two-point detecting screen, it is possible to reduce the processing load in the case of the two-point detection.

Figure 6:
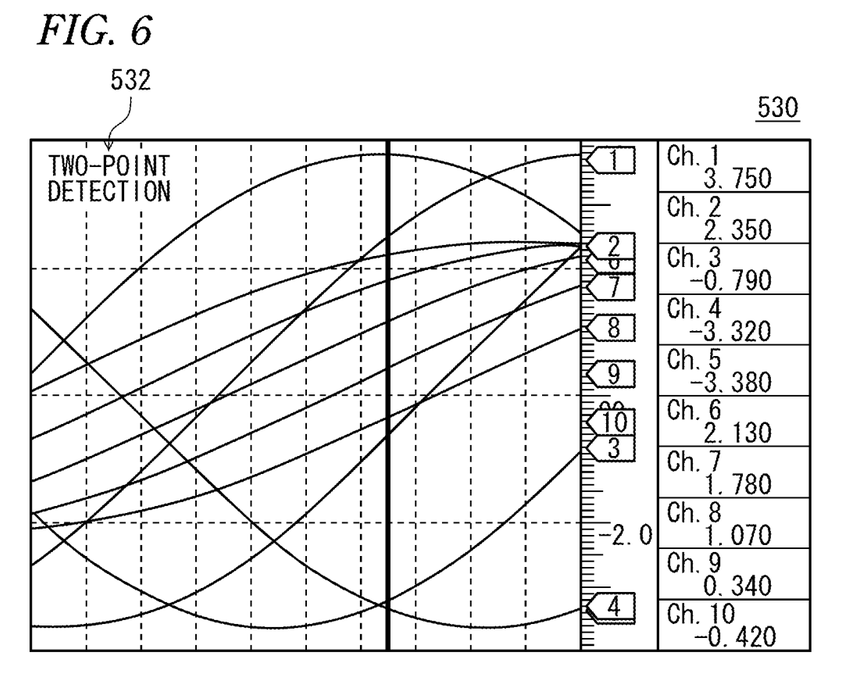
FIG. 6 is a diagram illustrating an example of a two-point detecting screen including information which indicates the two-point detecting screen is displayed.

In addition, by displaying the information which indicates whether the display screen is the two-point detecting screen or the one-point detecting screen on the display device 120, the touch detecting state may be notified to the user. In an example of the screen as shown in FIG. 6, the information 532 which indicates the two-point detecting screen is displayed on the display screen 530. The information which indicates the two-point detecting screen is not limited to the character, and the information can be a mark, a color or other item.

What is claimed is:

1. An electronic apparatus provided with a resistive film type touch panel, comprising:
    a two-point touch determining module configured to perform determination of a one-point touch or a two-point touch;
    a one-point touch coordinate detecting module configured to detect a coordinate of the one-point touch;
    a two-point touch coordinate detecting module configured to detect two-point coordinates of the two-point touch;

a display screen generating module configured to generate a display screen of the resistive film type touch panel, wherein the display screen comprises a one-point detecting screen or a two-point detecting screen; and a touch input controlling module configured to determine whether the display screen is the one-point detecting screen or the two-point detecting screen prior to an interaction of a user with the display screen, wherein the touch input controlling module performs a coordinate detection using the one-point touch coordinate detecting module when the touch to the resistive film type touch panel is detected in the one-point detecting screen, and, the touch input controlling module performs the coordinate detection using the one-point touch coordinate detecting module or the two-point touch coordinate detecting module according to a determination result of the two-point touch determining module when the touch to the resistive film type touch panel is detected in the two-point detecting screen.

2. The electronic apparatus according to claim 1,
wherein the touch input controlling module is configured to make a touch detecting period of the one-point detecting screen be shorter than that of the two-point detecting screen.

3. The electronic apparatus according to claim 1,
wherein the display screen generating module is configured to make a screen updating period of the one-point detecting screen be shorter than that of the two-point detecting screen.

4. The electronic apparatus according to claim 1,
wherein the display screen generating module is configured to include information, which indicates whether it is the one-point detecting screen or the two-point detecting screen, on the display screen.

5. The electronic apparatus according to claim 1, wherein the electronic apparatus functions as a waveform display device, and wherein the two-point detecting screen includes a waveform display screen.

6. An electronic apparatus provided with a resistive film type touch panel, comprising:

a two-point touch determining module configured to perform determination of a one-point touch or a two-point touch;

a one-point touch coordinate detecting module configured to detect a coordinate of the one-point touch;

a two-point touch coordinate detecting module configured to detect two-point coordinates of the two-point touch;

a display screen generating module configured to generate a display screen of the resistive film type touch panel, wherein the display screen comprises a one-point detecting screen or a two-point detecting screen; and a touch input controlling module configured to determine whether the display screen is the one-point detecting screen or the two-point detecting screen prior to the touch, wherein the touch input controlling module performs a coordinate detection using the one-point touch coordinate detecting module when the touch to the resistive film type touch panel is detected in the one-point detecting screen, and, the touch input controlling module performs the coordinate detection using the one-point touch coordinate detecting module or the two-point touch coordinate detecting module according to a determination result of the two-point touch determining module when the touch to the resistive film type touch panel is detected in the two-point detecting screen, wherein the electronic apparatus functions as a waveform display device, and wherein the two-point detecting screen includes a waveform display screen, wherein when the two-point touch occurs and comprises a narrowing touch on the waveform display screen of the two-point detecting screen, a waveform on the waveform display screen is reductively displayed in a time axis direction.

* * * * *